United States Patent
Rahal-Arabi et al.

(10) Patent No.: US 10,628,367 B2
(45) Date of Patent: Apr. 21, 2020

(54) TECHNIQUES FOR DYNAMICALLY MODIFYING PLATFORM FORM FACTORS OF A MOBILE DEVICE

(71) Applicant: INTEL CORPORATION, Santa Clara, CA (US)

(72) Inventors: Tawfik M. Rahal-Arabi, Tigard, OR (US); Prashant Sethi, Folsom, CA (US); Anthony M. Constantine, Portland, OR (US); Yu-Liang Shiao, Taipei (TW); Chang-Wu Yen, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 102 days.

(21) Appl. No.: 15/393,204

(22) Filed: Dec. 28, 2016

(65) Prior Publication Data

US 2018/0181527 A1 Jun. 28, 2018

(51) Int. Cl.
*G06F 13/40* (2006.01)
*G06F 13/16* (2006.01)

(52) U.S. Cl.
CPC ...... *G06F 13/4081* (2013.01); *G06F 13/1668* (2013.01)

(58) Field of Classification Search
CPC .......................... G06F 13/1668; G06F 13/4081
See application file for complete search history.

(56) References Cited

U.S. PATENT DOCUMENTS

| | | | |
|---|---|---|---|
| 9,672,184 B1 * | 6/2017 | Jain | G06F 13/409 |
| 2009/0198852 A1 | 8/2009 | Rofougaran | |
| 2010/0217912 A1 * | 8/2010 | Rofougaran | H04M 1/72527 710/304 |
| 2011/0106954 A1 | 5/2011 | Chatterjee et al. | |
| 2015/0007190 A1 | 1/2015 | Diefenbaugh et al. | |
| 2015/0095598 A1 | 4/2015 | Abou Gazala et al. | |

FOREIGN PATENT DOCUMENTS

KR 20130091184 A 8/2013

OTHER PUBLICATIONS

International Search Report for the International Patent Application No. PCT/US20171063840, dated Jun. 26, 2018, 7 pages.
International Preliminary Report on Patentability for the International Patent Application No. PCT/US2017/063840, dated Jul. 11, 2019, 11 pages.

* cited by examiner

*Primary Examiner* — Eric T Oberly

(57) ABSTRACT

Examples include techniques for dynamically modifying a platform form factor of a mobile device. In some examples, a system may include a split memory array having a first memory within a docking system and a second memory element within a small form factor (SFF) mobile device. A platform form factor determination component may dynamically select between multiple platform form factors based on a determination that the SFF mobile device is coupled with the docking system. An interface logic component may access the first memory storage of the docking system during a memory (e.g., graphics) computation when the mobile device is physically and electrically/communicably coupled with the docking system to allow the SFF mobile device to have full LFF functionality. When the SFF mobile device is disconnected from the docking system, the interface logic component may access only the second memory storage of the SFF mobile device to provide SFF functionality.

16 Claims, 9 Drawing Sheets

TECHNIQUES FOR DYNAMICALLY MODIFYING PLATFORM FORM FACTORS OF A MOBILE DEVICE

TECHNICAL FIELD

Examples described herein generally relate to platform form factor display modes and more specifically to dynamically modifying a platform form factor of a mobile device.

BACKGROUND

In some examples, small form factor (SFF) devices such as handheld computers, personal digital assistants (PDAs) and smart phones have been used to leverage the capabilities of the Internet and provide users ubiquitous access to information. Despite the proliferation of these devices, usage of SFF mobile devices has been constrained by small screen size, and limited input and memory capabilities. As such, a significant portion of today's applications and web content is still designed for use with desktop computers. Information architecture (IA) and large form factor (LFF) devices offer full performance and full desktop PC functionality for today's applications and web content. However, IA and LFF applications are inherently unfriendly for SFF mobile devices. For example, both IA and LFF display modes require larger power delivery footprints for memory and display, as well as for other subsystems. As a result, it remains a constant challenge to balance the benefits and capabilities of LFF versus SFF.

DETAILED DESCRIPTION

The present disclosure is generally directed to dynamically modifying a platform form factor of small form factor (SFF) mobile devices. For example, in an effort to provide full large form factor (LFF) functionality in a SFF mobile device the platform form factor for the SFF mobile device can be dynamically modified. In some examples, a system may include a split memory array having a first memory within a docking system and a second memory element within a small form factor (SFF) device. A platform form factor (PFF) determination component may dynamically select between multiple platform form factors based on a determination whether the SFF mobile device is coupled (e.g., physically and electrically/communicably, or wirelessly) with a docking system. An interface logic component may access the first memory storage of the docking system during a graphics computation when the mobile device is physically and electrically coupled with the docking system to allow the SFF mobile device to have full LFF functionality. When the SFF mobile device is disconnected from the docking system, the interface logic component may access only the second memory storage of the SFF mobile device to provide SFF functionality. As a result, memory space and bandwidth of the SFF mobile device may be conserved.

Figure 1:
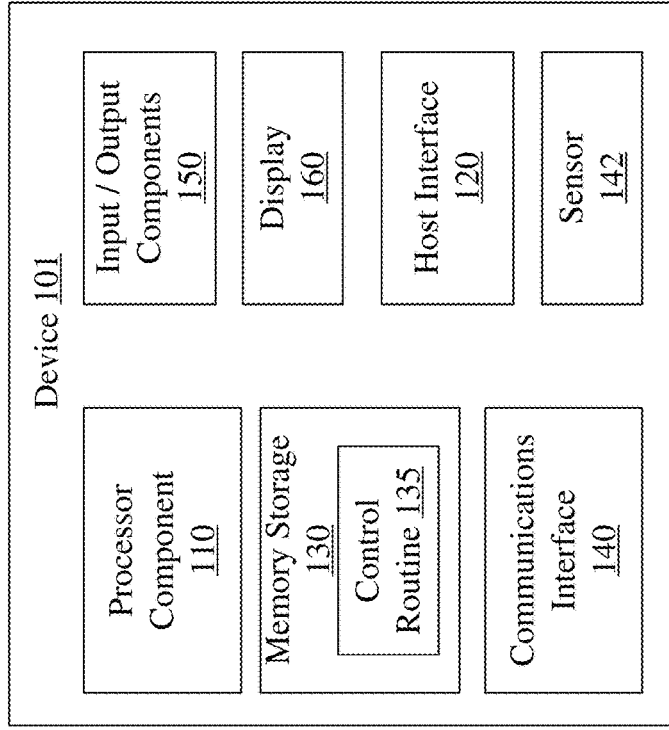
FIG. 1 illustrates an example system.
Figure 1:
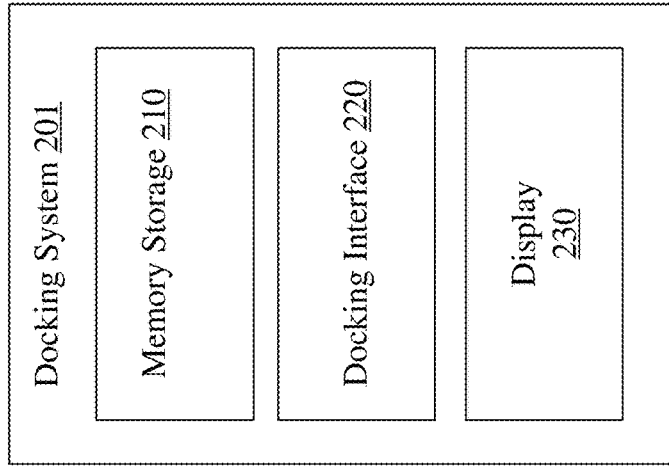
Figure 1:
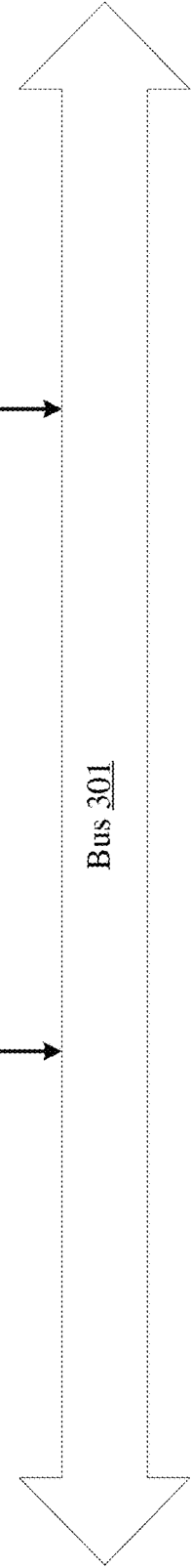

FIG. 1 illustrates an example first system 100. As shown in this figure, the example first system 100 includes a device 101, such as a SFF mobile device, and a docking system 201. As depicted, the device 101 and the docking system 201 are operably/communicably coupled. As further described below, the device 101 and the docking system 201 are physically and electrically coupled to allow a display 160 of the device 101 to be generated or mirrored on one or more displays 230 operably coupled with the docking system 201. With some examples, the device 101 may be implemented as a System-on-Chip (SoC) or the like. For example, the device 101 may be a SoC, and the docking system 201 may operably couple to the SoC. Examples are not limited in this context.

In general, FIG. 1 illustrates the system 100 where the docking system 201 provides a convenient interface for transferring data between the device 101 and one or more additional computing devices such as a personal computer or peripheral devices such as speakers and one or more displays 230 without having to reconnect and disconnect cables. The docking system 201 may also provide an interface for connecting to a power source (not shown) so that the device 101 can be powered or charged (e.g., battery). In some cases, the docking system 201 includes a housing (not shown) having a connector for physically and electrically coupling the device 101 and the docking system 201, as will be described in greater detail below. In some examples, the housing of the docking system 201 may be sized and shaped to coincide with the size and shape of a particular device shape and/or style. In other examples, the housing of the docking system 201 or the connector of the docking system 201 may be universal or generic to multiple device shapes and styles.

The device 101 and the docking system 201 may be operably coupled via a communication bus 301. In general, the communication bus 301 may be any data communication bus and/or interface, such as, for example without limitation: a peripheral component interconnect express (PCIe), which can be implemented according to the Peripheral Component Interconnect (PCI) Express Base Specification, revision 3.1a, published in December 2015 ("PCI Express specification" or "PCIe specification") the Non-Volatile Memory Express (NVMe) Specification, revision 1.2a, published in October 2015 ("NVM Express specification" or "NVMe specification"); a serial attached small computer system interface (SCSI) (SAS), which can be implemented according to the Serial Attached SCSI (SAS) Specification, revision 3.0, published in November 2013 ("SAS-3 specification"); a universal serial bus (USB), which can be implemented according to the Universal Serial Bus Specification, published Apr. 27, 2000 ("USB 2.0 Specification") or the Universal Serial Bus 3.1 Specification revision 1.0, published Jul. 26, 2013; a system management bus (SMBus), which can be implemented according to the System Management Bus (SMBus) Specification version 2.0, published Aug. 3, 2000; or a serial AT attachment (SATA), which can be implemented according to the Serial ATA Revision 3.0, published Jun. 2, 2009. In particular, the device 101 and the docking system 201 may each include an interface, for example, the host interface 120 and the docking interface 220, to operably connect to the bus 301. In particular, the interfaces 120 and 220 may enable the device 101 and the docking system 201 to send and receive information elements over the bus 301. Additionally, a third interface may be provided, for example, the communications interface 140.

In general, the host interface 120, the docking interface 220, and the communications interface 140 may include logic and/or features to support communication between the device 101 and the docking system 201. For these examples, host interface 120, docking interface 220, and communications interface 140 may include one or more interfaces that operate according to various communication protocols or standards to communicate over direct or network communication links. Direct communications may occur via use of communication protocols or standards described in one or more industry standards (including progenies and variants) such as those associated with the SMBus specification or the PCI Express specification. Network communications may occur via use of communication protocols or standards such those described in one or more Ethernet standards promulgated by the Institute of Electrical and Electronics Engineers (IEEE). For example, one such Ethernet standard may include Carrier sense Multiple access with Collision Detection (CSMA/CD) Access Method and Physical Layer Specifications, published in December 2012 (hereinafter "IEEE 802.3-2012").

System 100 may be part of a host computing platform that may be, for example, a server, a server array or server farm, a web server, a network server, an Internet server, a work station, a mini-computer, a main frame computer, a super-computer, a network appliance, a web appliance, a distributed computing system, multiprocessor systems, processor-based systems, or combination thereof. Accordingly, functions and/or specific configurations of system 100 described herein, may be included or omitted in various embodiments of system 100, as suitably desired.

The components and features of system 100 may be implemented using any combination of discrete circuitry, application specific integrated circuits (ASICs), logic gates and/or single chip architectures. Further, the features of system 101 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example device 101, the docking system 201, and the system 100 shown in the block diagram of FIG. 1 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in examples.

Referring more specifically to FIG. 1, the device 101 may be made up, at least in part, of a processor component 110, the host interface 120, memory storage 130, communications interface 140, input and/or output components 150, and a display 160. The memory storage 130 may include control routine 135, which may include programming, logic, and/or features to cause the device to perform various functions. For example, the control routine 135 may include an operating system or other programming to enable the device 101 to perform various functions including generating one or more signals to cause the processor component 110 to access the storage 220 of the docking system 201 and the memory storage 130 of the device 101 to perform a memory (e.g., graphics) computation when the device 101 is physically electrically coupled with the docking system 201. The control routine 135 may further detect whether the device 101 is physically coupled with the docking system, and to select between multiple platform form factors (e.g., SFF or LFF) based on whether the device 101 is physically coupled with the docking system 201.

As discussed herein, logics of the memory storage 130 may be graphics logic (also referred to herein as "GFX"), including a graphics processing unit (GPU) or other types of logic that perform computation(s) relating to graphics task(s), such as operation(s) that manipulate an image, video, frame, scene, etc., as will be further discussed herein. While some embodiments are discussed with reference to graphics logic, embodiments herein are not limited to graphics related logic and may be also applied to other types of non-graphic (e.g., general purpose) logic also. Moreover, various embodiments may be performed for any type of computing device such as a desktop computer, a mobile computer (such as a smartphone, tablet, UMPC (Ultra-Mobile Personal Computer), laptop computer, Ultrabook™ computing device, wearable device (such as a smart watch, smart glasses, etc.)), a work station, etc., which may be embodied on a SOC (System On Chip) platform in an embodiment.

With some examples, the processor component 110 may include circuitry or processor logic, such as, for example, any of a variety of commercial processors. In some examples, the processor component 110 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor component 110 may include graphics processing portions, such as a graphics processing unit (GPU), and may include dedicated memory, multiple-threaded processing and/or some other parallel processing capability.

The memory storage 130 may include logic, a portion of which includes arrays of integrated circuits, forming non-volatile memory to persistently store data or a combination of non-volatile memory and volatile memory. It is to be appreciated, that the memory storage 130 may be based on any of a variety of technologies. In particular, the arrays of integrated circuits included in memory storage 130 may be arranged to form one or more types of memory, such as, for example, dynamic random access memory (DRAM), NAND memory, NOR memory, 3-Dimensional cross-point memory, ferroelectric memory, silicon-oxide-nitride-oxide-silicon (SONOS) memory, polymer memory such as ferro-electric polymer memory, ferroelectric transistor random access memory (FeTRAM or FeRAM), nanowire, phase change memory, magnetoresistive random access memory (MRAM), spin transfer torque MRAM (STT-MRAM) memory, or the like. In some embodiments, the memory storage 210 of the docking system 201 and the memory storage 130 of the device together may form a split memory array.

In various examples, the input and/or output components 150 may include one or more components to provide input to or to provide output from the system 101. For example, the input and/or output components 150 may be a keyboard, mouse, joystick, microphone, track pad, speaker, haptic feedback device, or the like. In various embodiments, the display 160 may be based on any of a variety of displays (e.g., Plasma, LCD, LED, OLED, or the like) for displaying images and may include touch functionality.

The host interface 120 may be any of a variety of interfaces to operably connect the device 101 to the docking system 201. In particular, the host interface 120 may be configured to operably connect to docking interface 220 within the docking system 201 via the bus 301.

The docking system 201 may be made up, at least in part, of memory storage 210, docking interface 220 and the display 230. In various embodiments, the display 230 may be based on any of a variety of displays (e.g., Plasma, LCD, LED, OLED, or the like) for displaying images and may include touch functionality. In some examples, the display 230 is intended to regenerate or mirror the graphics being rendered by the display 160. In yet other examples, the display 230 will display graphics corresponding to LFF functionality, while the display 160 will simultaneously render graphics corresponding to SFF functionality.

In general, the memory storage 210 may include logic, a portion of which includes arrays of integrated circuits, forming non-volatile memory to persistently store data or a combination of non-volatile memory and volatile memory. It is to be appreciated, that the docking system 201, and particularly, the memory storage 210 may be based on any of a variety of technologies. In particular, the arrays of integrated circuits included in memory storage 210 may be arranged to form one or more types of memory, such as, for example, DRAM, NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque (STT) memory, or the like. In some examples, the memory storage 210 is a graphics (GFX) memory capable of supporting full LFF or PC functionality when the device 101 is docked with the docking system 201. The memory storage 210 may provide the additional memory necessary for switching between SFF and LFF.

The docking interface 220 may be any of a variety of interfaces to operably connect the docking system 201 to the device 101. In particular, the docking interface 220 may be configured to operably connect to host interface 120 within the device 101 via the bus 301.

The device 101 may further include a sensor(s) 142 for detecting system configuration changes, e.g., detect whether the device 101 is docked or undocked. In some examples, the sensor 142 may alternatively be provided as part of the docking system 201, wherein communication regarding the docking status of the mobile device 101 may be delivered from the docking interface 220 to the processor component 110. The sensor 142 may provide system configuration information to the processor component 110, which may in turn cause modification to the platform form factor to be generated and displayed on the display 230. The sensor 142 may further provide system configuration information to the processor component 110, which may in turn activate or provide instructions to access the memory storage 210 of the docking system 201.

Figure 2A:
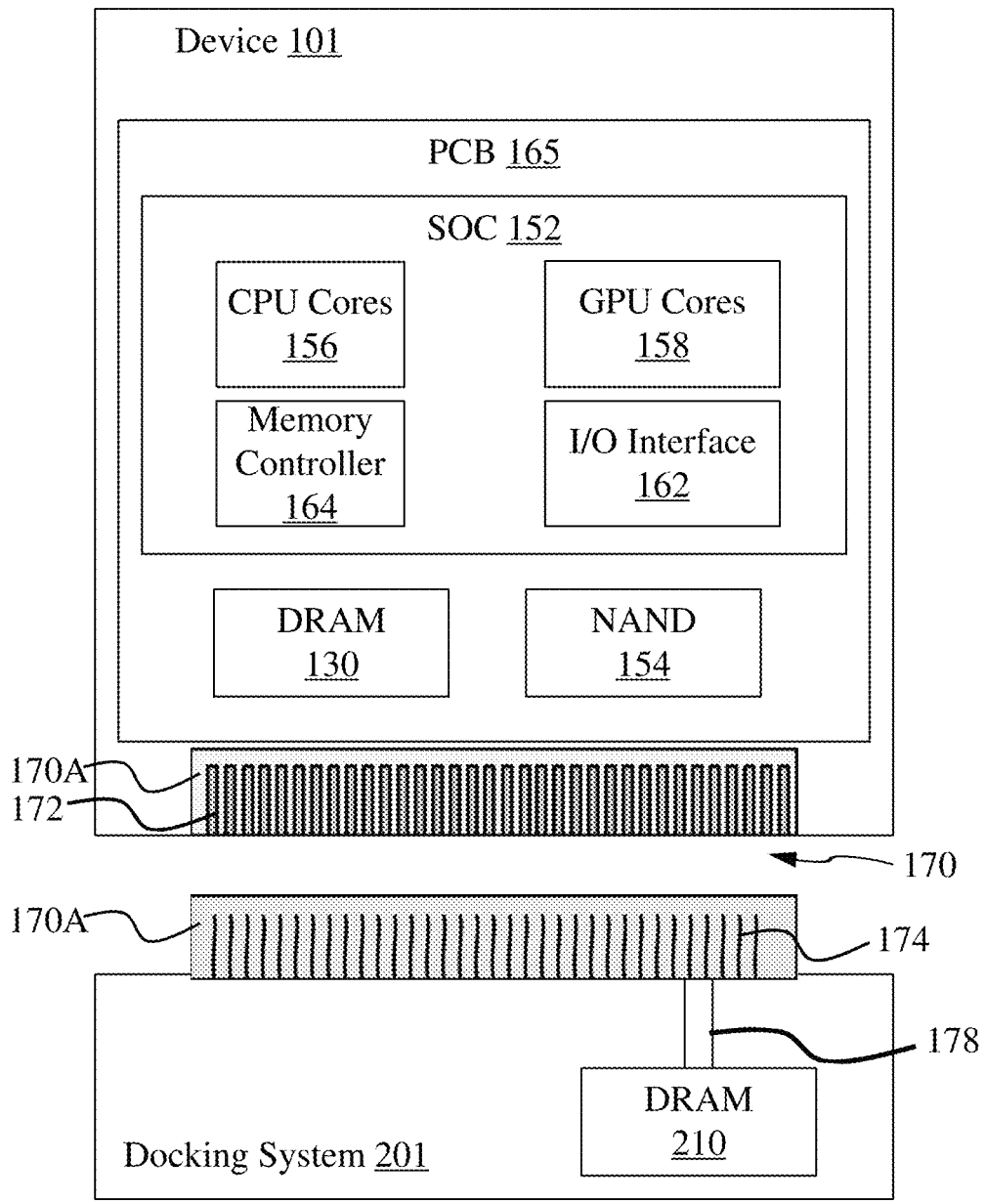
FIGS. 2A-B illustrate an example first apparatus.
Figure 2B:
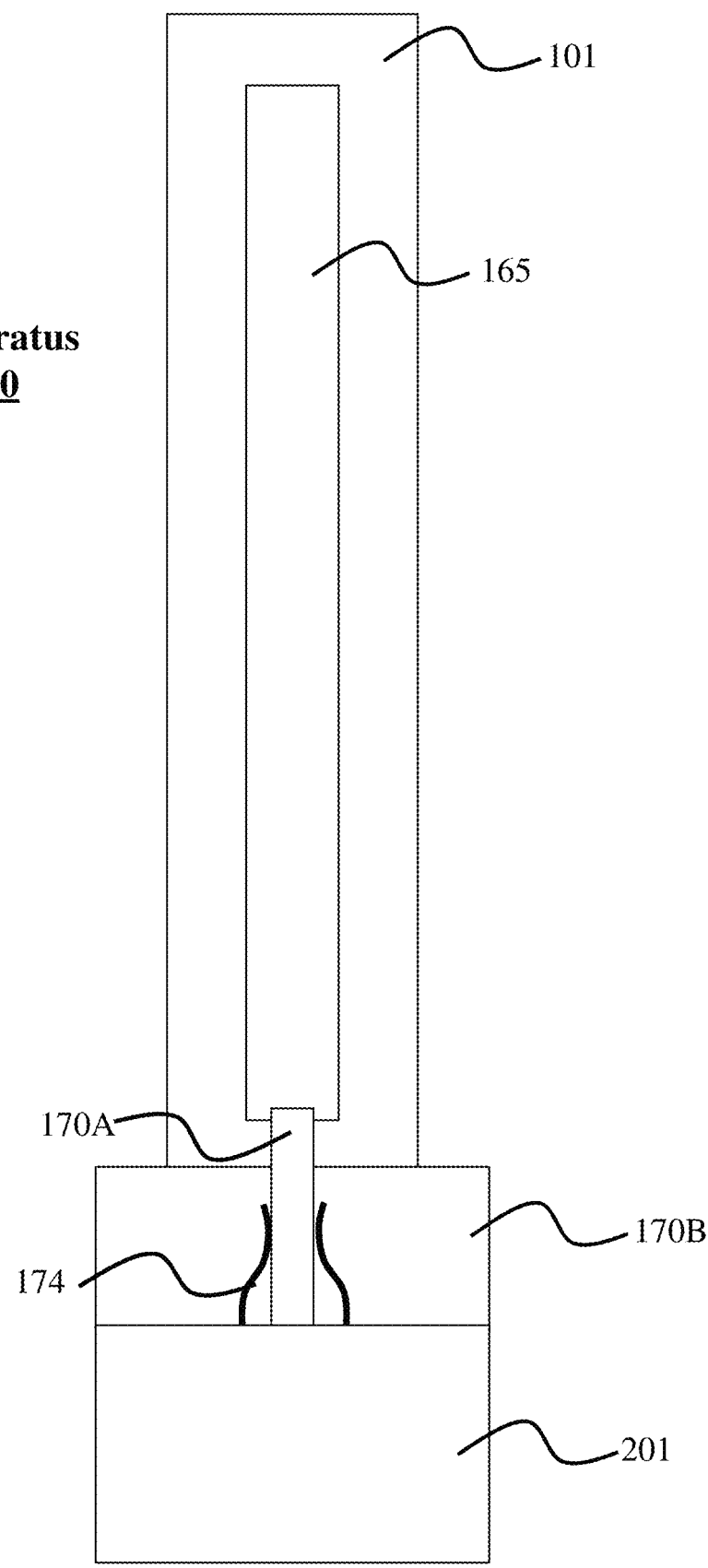

Turning to FIGS. 2A-B, an apparatus 200 demonstrating interoperability of the device 101 and the docking system 201 will be described in greater detail. FIG. 2A is a schematic diagram showing the device 101 and the docking system 201 in a disconnected configuration, while FIG. 2B is a side view demonstrating the device 101 and the docking system 201 in a connected configuration. In some examples, the device 101 is a SFF mobile device including a SOC 152, the memory storage 130 (e.g., DRAM), and NAND 154 coupled to a printed circuit board (PCB) 165. As illustrated, the SOC 152 may include one or more CPU cores 156, one or more GPU cores 158, an I/O interface 164, and a memory controller 164. Various components of the SOC 152 may be coupled to an interconnect or bus such as discussed herein with reference to the other figures. Also, the SOC 152 may include more or less components, such as those discussed herein with reference to the other figures. For example, each component of the SOC 152 may include one or more other components, e.g., as discussed with reference to the other figures herein. In one embodiment, the SOC 152 is provided on one or more Integrated Circuit (IC) dies, e.g., which are packaged into a single semiconductor device. As further shown, the SOC 152 is operably coupled to the memory storage 130 via the memory controller 164.

In some examples, NAND 154 causes the GPU core(s) 158 to access the memory storage 210 of the docking system 201 during a memory computation when the device 101 is physically and electrically coupled with the docking system 201, for example, as shown the cross-sectional view of FIG. 2B. NAND 154 may further cause the CPU core(s) 156 and/or the GPU core(s) 158 to determine whether the device 101 is physically and electrically coupled with the docking system 201, for example based on an output from the sensor 142 (FIG. 1), and to select between multiple platform form factors based on the determination whether the device 101 is docked or disconnected. In some examples, NAND 154 may further cause the CPU core(s) 156 and/or the GPU core(s) 158 to select a SFF display mode in the case the device 101 is determined to be disconnected from the docking system 201, and to select a LFF display mode in the case the device 101 is physically and electrically coupled with the docking system 201. In some examples, NAND 154 causes the CPU core(s) 156 and/or the GPU core(s) 158 to perform the graphics computation in the LFF display mode using memory storage 130 and memory storage 210 when the device 101 is docked, and to perform the graphics computation in the SFF display mode using only memory storage 130 when the device 101 is not docked. In some examples, NAND 154 causes the CPU core(s) 156 and/or the GPU core(s) 158 to change the display mode from SFF to LFF when the device 101 is initially coupled with the docking system 201, and to change the display mode from LFF to SFF as soon as the device 101 is decoupled from the docking system 201.

In some examples, the NAND 154 takes the place of an additional DRAM component that may be present on the PDB 165 for SFF mobile devices. As a result, routing to the docking system 201 may be on a different layer than the NAND 154 routing so the physical area is not consumed, providing a net area benefit in the device 101. This routing may be accomplished via a connector 170 coupling the PCB 165 of the device 101 with the memory storage 210 (e.g., DRAM) of the docking system 201. More specifically, as shown, the connector 170 may include a first connector element 170A extending from the PCB 165 of the device 101, and a second connector element 170B extending from an external area of the docking system 201 to matingly receive the first connector element 170A. In some embodiments, the first connector element 170A may include a plurality of elongate receptacles (e.g., electrical contact surfaces) 172 for receiving a corresponding plurality of pins 174 of the second connector element 170B.

More specifically, in some examples, the connector 170 is a card edge-type connector having a housing, such as the second connector element 170B, and a plurality of contacts, such as the plurality of pins 174, retained in the housing. In some examples, the connector 170 is a high pin count card edge connector having approximately 150-200 pins 174 arranged in two rows to sandwich a module of the docking system 201 at one end thereof, and to straddle the first connector element 170A at another end thereof. As shown, the plurality of pins 174 may be formed with a receiving space between each row of pins to retain the first connector element 170A.

As further shown in FIG. 2B, in some examples, the first connector element 170A may be surrounded or buttressed by the second connector element 170B when the device 101 is docked with the docking system 201. As configured, the second connector element 170B may provide mechanical support, while the plurality of pins 174 engage the plurality of elongate receptacles 172. In some embodiments, the plurality of pins 174 form a normally-open contact switch with the elongate receptacles 172, wherein a closed circuit is formed between the first connector element 170A and the plurality of pins 174 via the elongate receptacles 172 when the first connector element 170A is brought into engagement with the second connector element 170B. In some examples, the closed contact arrangement sends a signal to the sensor 145 and/or processor component 110 (FIG. 1) indicating that the device 101 and the docking system 201 are physically and electrically engaged. In some examples, a data communication path 178 (FIG. 1) may extend between the plurality of pins 174 and the memory storage 210 and the PCB 165 to provide data communication therebetween.

Figure 3:
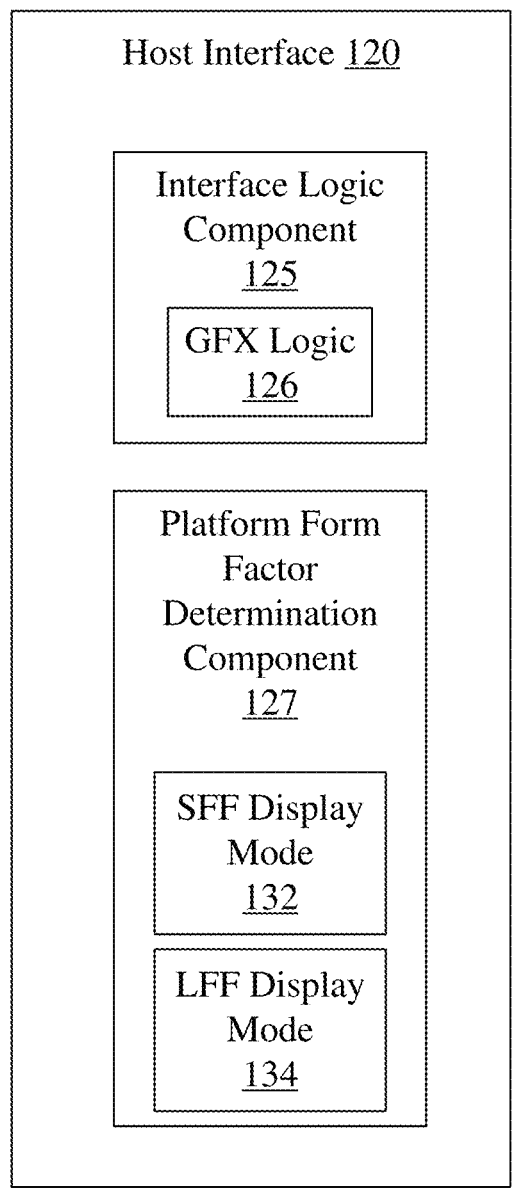
FIG. 3 illustrates an example second apparatus.

FIG. 3 illustrates an example of a portion 300 of the system 100 depicted in FIG. 1. In particular, FIG. 3 depicts a block diagram of the host interface 120 in greater detail. As shown, the host interface 120 may comprise an interface logic component 125, including GFX logic 126, and a platform form factor determination component 127. In general, the interface logic component 125 may include circuitry and/or features to facilitate communication over the bus 301. For example, where the bus 301 is a NVMe bus, the interface logic component 125 may include circuitry and/or features to communicate via an NVMe bus and particularly in compliance with any NVMe standards. For example, the interface logic 125 may include circuitry to implement communications protocols in compliance with the NVMe Specification. In general, the platform form factor determination component 127 may include circuitry and/or features to determine and negotiate a display mode (e.g., SFF or LFF) with another interface (e.g., the docking interface 220, or the like) and to enable the interface logic component 125 to operate based on the determined or negotiated display mode. This is explained in greater detail below, for example, with respect to FIG. 5. For example, the interface logic component 125 may implement a change to the graphics to be displayed by the device 101, e.g., video/image streaming resolution, pixel resolution, frame rate, format, and/or compression levels. In particular, the GFX logic 126 may perform memory computation(s) relating to graphics task(s), such as operation(s) that manipulate an image, frame, scene, etc., e.g., as will be further discussed herein.

In some examples, host interface 120 may also include a graphics interface 128 that communicates with a display device, such as display 160 or display 230 of FIG. 1. In one example, the graphics interface 128 may communicate with the display 160/230 via an accelerated graphics port (AGP) or PCIe interface). In one example, the display 160/230 may communicate with the graphics interface 128 through, for example, a signal converter that translates a digital representation of an image stored in a storage device such as video memory or system memory into display signals that are interpreted and displayed by the display 160/230. The display signals produced by the display 160 may pass through various control devices before being interpreted by and subsequently displayed on the display 160/230.

In some examples, the platform form factor determination component 127 may dynamically select between multiple platform form factors based on a determination whether the device 101 is physically and electrically coupled with the docking system 201. For example, the platform form factor determination component 127 may receive a control signal (e.g., from the control routine 135, or the like) to include an indication that the device 101 is coupled/decoupled with the docking system 201. The platform form factor determination component 127 may further select a LFF display mode 134 in the case the mobile device 101 is docked at the docking system 201, or may select a SFF display mode 134 in the case the mobile device 101 is disconnected from the docking system 201.

Based on receiving the docking indication, the platform form factor determination component 127 may send a control signal to the docking interface 220 to negotiate a graphics computation in either the SFF display mode 132 or the LFF display mode 134. This is explained in greater detail below with reference to FIG. 5. However, in general, the platform form factor determination component 127 may send a control signal to the docking interface 220 to access the memory storage 210 of the docking system 201 to perform a LFF graphics computation in the case the mobile device 101 is connected with the docking system 201. In some examples, the platform form factor determination component 127 may send a control signal to the docking interface 220 to access both the memory storage 210 and the memory storage 130, as the GFX bandwidth of the LFF graphics computation may require increased memory resources from multiple locations.

In some examples, the platform form factor determination component 127 may also cause a change in the display mode from the SFF display mode 132 to the LFF display mode 134 when the mobile device 101 is physically and electrically coupled with the docking system 201. The platform form factor determination component 127 may also cause a change in the display mode from the LFF display mode 134 to the SFF display mode 132 when the mobile device 101 is no longer physically and electrically coupled with the docking system 201, e.g., in the case a user has removed from the device 101 from the docking system 201.

Figure 4:
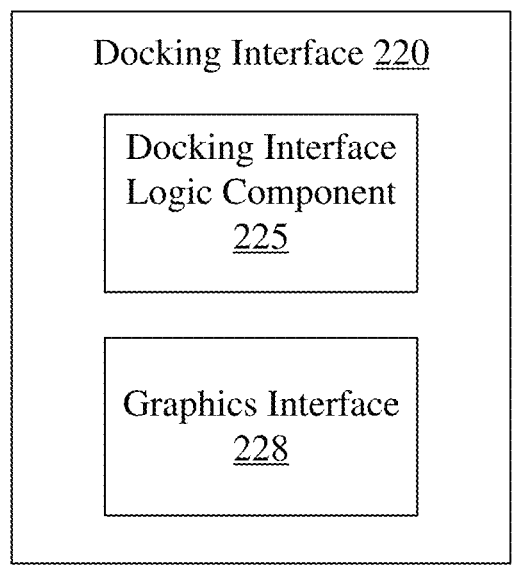
FIG. 4 illustrates an example third apparatus.

FIG. 4 illustrates an example of a portion 400 of the system 100 depicted in FIG. 1. In particular, FIG. 4 depicts a block diagram of the docking interface 220 in greater detail. As shown, the docking interface 220 may comprise a docking interface logic component 225, which may include circuitry and/or features to facilitate communication over the bus 301. For example, the docket interface logic 225 may include circuitry to implement communications protocols in compliance with the NVMe specification. In general, the docking interface logic component 225 may include elements to determine and negotiate a display mode (e.g., SFF or LFF) with another interface (e.g., the host interface 120, or the like) and to operate based on the determined or negotiated display mode. This is explained in greater detail below, for example, with respect to FIG. 5. For example, the docking interface logic component 225 may implement a change to the graphics to be displayed by the display 230, e.g., video/image streaming resolution, pixel resolution, frame rate, format, and/or compression levels. In some examples, a GFX logic of the docking interface logic component 225 may perform memory computation(s) relating to graphics task(s), such as operation(s) that manipulate an image, frame, scene, etc., e.g., as will be further discussed herein.

In some examples, the docking interface 220 may also include a graphics interface 228 that communicates with a display device, such as the display 160 or the display 230. In one example, the graphics interface 228 may communicate with the display 160/230 via an accelerated graphics port (AGP) or PCIe interface. In one example, the display 160/230 may communicate with the graphics interface 228 through, for example, a signal converter that translates a digital representation of an image stored in a storage device such as video memory or system memory into display signals that are interpreted and displayed by the display 160/230. The display signals produced by the display 160/230 may pass through various control devices before being interpreted by and subsequently displayed on the display 160/230.

In some examples, the docking interface logic component 225 may include logic to cause a processor, such as the processor component 110 of FIG. 1, to access a first memory storage within the docking system 201 as part of execution of a memory computation in response to the device 101 being coupled to the interface. In some examples, the docking interface logic component 225 may include logic to determine whether the device 101 is physically and electrically coupled with the docking system 201, and to select between multiple platform form factors in response to a determination that the device 101 is physically and electrically coupled with the docking system 201. In some examples, the docking interface logic component 225 may include logic to select a small form factor display mode for execution of the memory computation in response to the device 101 not being physically and electrically coupled with the docking system 201, and to select a large form factor display mode for execution of the memory computation in response to the device 101 being physically and electrically coupled with the docking system 201.

In some examples, the docking interface logic component 225 further includes logic to perform a graphics computation in the large form factor display mode using the first memory storage within the docking system 201 and the second memory storage located within the device 101. In some examples, the docking interface logic component 225 further includes logic to perform a graphics computation in the small form factor display mode using only the second memory storage of the device 101.

Included herein is one or more techniques and/or logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
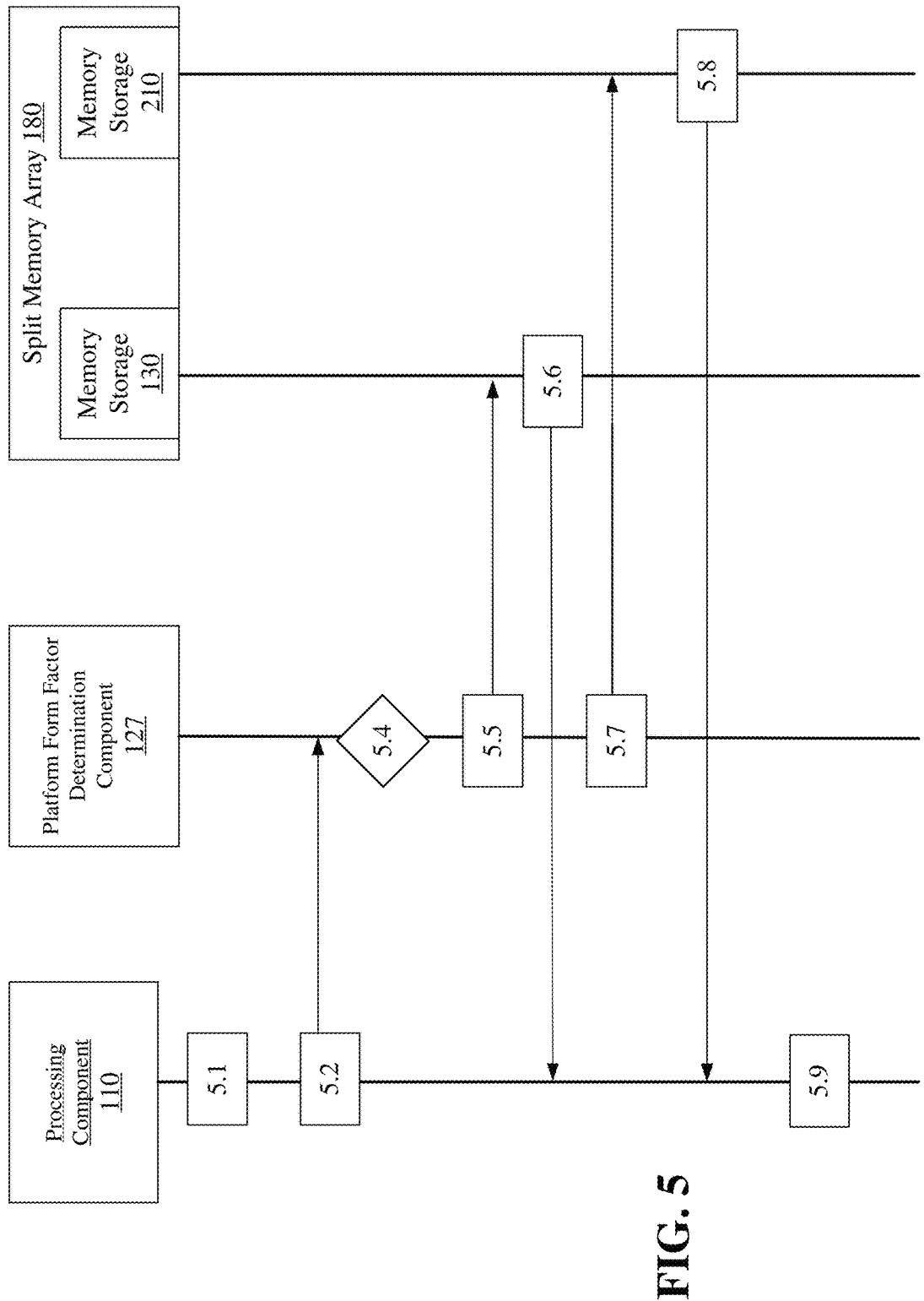
FIG. 5 illustrates an example logic flow for an apparatus.

A technique or a logic flow may be implemented in software, firmware, and/or hardware. In software and firmware embodiments, a technique or a logic flow may be implemented by computer executable instructions stored on at least one non-transitory computer readable medium or machine readable medium, such as an optical, magnetic or semiconductor storage. The embodiments are not limited in this context. FIG. 5 illustrates an example technique 500 for dynamically adjusting a platform form factor of a mobile device using a split memory array. In particular, the technique 500 depicts an example logic flow to provide switching between SFF and LFF based on whether the device 101 is docked with the docking system 201. The technique 500 may begin at block 5.1, wherein a request is received to perform a graphics computation at the processor component 110. At block 5.2, the processor component 110 sends a signal requesting graphics files from a memory array 180 to execute the graphics computation. The platform form factor determination component 127 receives the signal from the processor component 110, and at block 5.3, determines whether the device 101 is physically and electrically coupled with the docking system 201. In some examples, the closed contact arrangement of the connector 170 sends a signal to the sensor 145 indicating that the device 101 and the docking system 201 are physically and electrically engaged.

Continuing to block 5.5, in the case the platform form factor determination component 127 determines that the device 101 is not docked with the docking system 201, a signal is sent to the memory storage 130 of the memory array 180. At block 5.6, the memory storage 130 returns the graphics files to the processor component 110 necessary for execution of the graphics computation in the SFF display mode. Continuing to block 5.7, in the case the platform form factor determination component 127 determines that the device 101 is docked with the docking system 201, a signal is sent to the memory storage 210 of the memory array 180. At block 5.8, the memory storage 210 returns the graphics files necessary for the processor component 110 to execute the graphics computation in LFF display mode. At block 5.9, the graphics computation is executed and an output of the graphics computation is rendered via the display 160 and/or the display 230.

Figure 6:
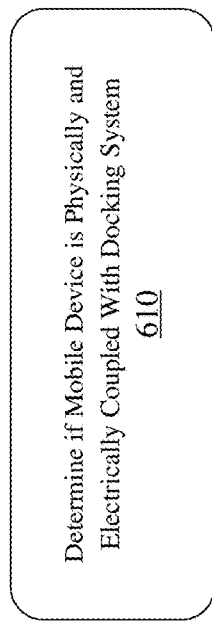
FIG. 6 illustrates an example first process flow.
Figure 6:
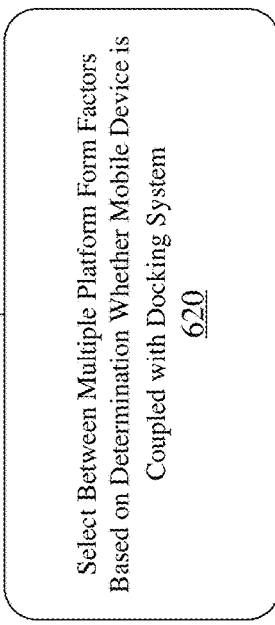
Figure 6:
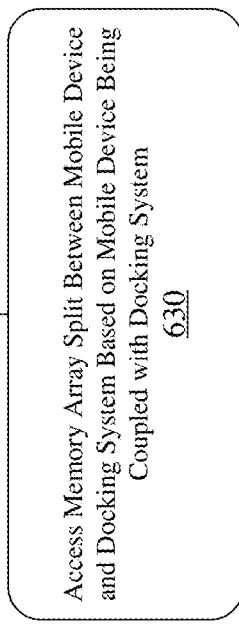

FIG. 6 illustrates an example of a first logic flow. As shown in this figure, the first logic flow includes a logic flow 600. Logic flow 600 may be representative of some or all of the operations executed by one or more logic, features, or devices described herein, such as the host interface 120 or the platform form factor determination component 127.

In this illustrated example, logic flow 600 at block 610 may determine if a mobile device is physically and electrically coupled with a docking system. For example, the platform form factor determination component 127 of the device 101 may receive an indication (e.g., from the docking system 201, the control routine 135, or the like) that the device 101 is docked with the docking system 201.

The logic flow 600 at block 620 may select between multiple platform form factors based on a determination whether the mobile device is physically and electrically coupled with the docking system. For example, the platform form factor determination component 127 of the device 101 may select between SFF display mode 132 and LFF display mode 134. In one example, the platform form factor determination component 127 selects the SFF display mode in the case the device 101 is not physically and electrically coupled with the docking system. In another example, the platform form factor determination component 127 selects the LFF display mode in the case the device 101 is determined to be physically and electrically coupled with the docking system.

The logic flow 600 at block 630 may receive a control signal to cause a processor of a mobile device to access one or more memory storage locations of a memory array split between a mobile device and a docking system based on the mobile device being physically and electrically coupled with the docking system. For example, the platform form factor determination component 127 of the device 101 may access the memory storage 130 of the device 101 and the memory storage 210 of the docking system 201 when the device 101 is docked with the docking system 201 so as to provide adequate GFX bandwidth for a LFF graphics computation. In another example, the platform form factor determination component 127 of the device 101 may access just the memory storage 130 of the device 101 when the device 101 is disconnected from the docking system 201 so as to perform a SFF graphics computation. Without access to the memory storage 210 of the docking system 201, GFX bandwidth limits prevent the device 101 from performing a LFF graphics computation.

Figure 7:
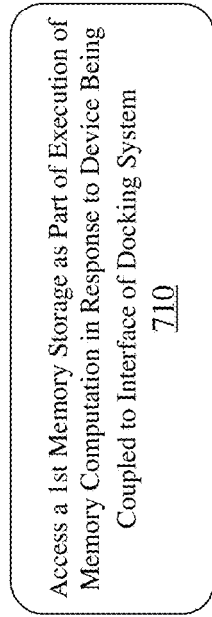
FIG. 7 illustrates an example second process flow.
Figure 7:
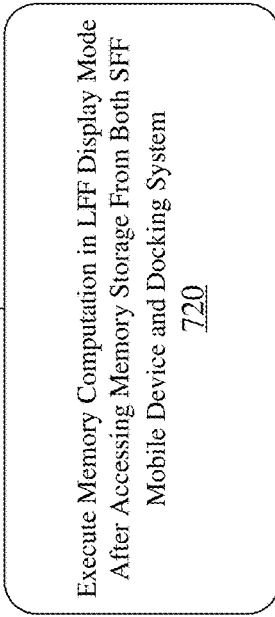
Figure 7:
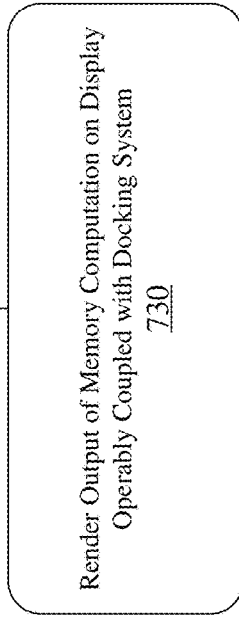

FIG. 7 illustrates an example of a second logic flow 700. Logic flow 700 may be representative of some or all of the operations executed by one or more logic, features, or devices described herein, such as docking interface 220 or platform form factor determination component 127.

In this illustrated example, logic flow 700 at block 710 may generate one or more signals to cause a processor to access a first memory storage as part of execution of a memory computation in response to the device 101 being coupled to an interface of the docking system 201. For example, the platform form factor determination component 127 of the device 101 may access the memory storage 130 of the device 101 and the memory storage 210 of the docking system 201 when the device 101 is docked with the docking system 201 so as to provide adequate GFX bandwidth for a LFF graphics computation.

The logic flow at block 720 may execute the memory computation in a LFF display mode after accessing both the memory storage 130 of the device 101 and the memory storage 210 of the docking system 201. In some examples, when the device 101 is docked with the docking system 201, additional GFX bandwidth is available for a LFF graphics computation.

The logic flow at block 730 may render an output of the memory computation on a display operably coupled with the docking system 201, such as an external monitor. In some examples, a visual output of a graphics computation is rendered via one or more LFF functional computer monitors connected with the docking system 201.

Figure 8:
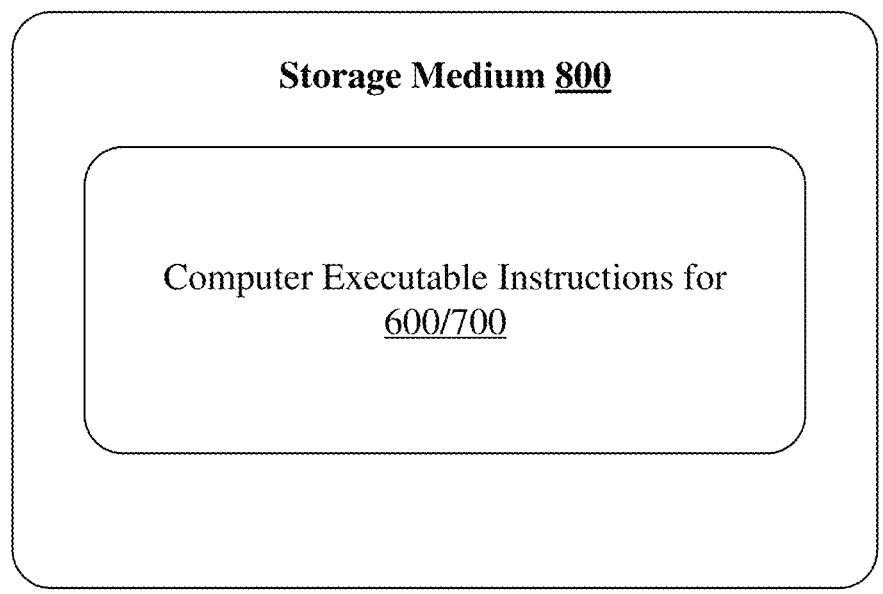
FIG. 8 illustrates an example storage medium.

FIG. 8 illustrates an example of a first storage medium. As shown in this figure, the first storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 600 and logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
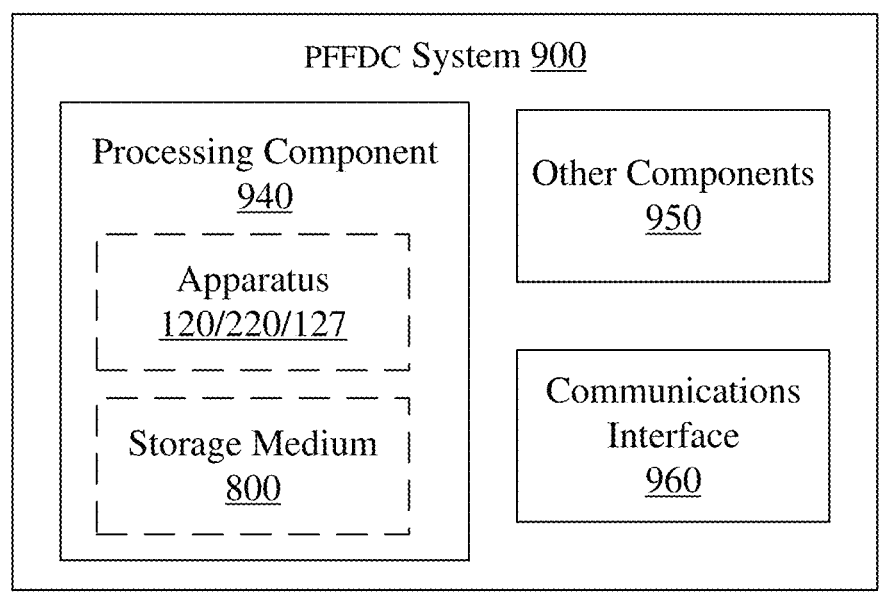
FIG. 9 illustrates an example computing platform.

FIG. 9 illustrates an example platform form factor determination component (PFFDC) system 900. In some examples, as shown in this figure, the system 900 may include a processor component 940, other components 950, and/or a communications interface 960. According to some examples, system 900 may be implemented in a device to be coupled to an interface, such as an SSD, a memory component, a communications component, an input component, an output component, or the like.

According to some examples, processor component 940 may execute processing operations or logic for apparatus 120, 220, 127, and/or storage medium 800. Processor component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other components 950 may include common computing elements or circuitry, such as one or more processors, multi-core processors, co-processors, memory units, interfaces, oscillators, timing devices, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory or any other type of storage media suitable for storing information.

In some examples, communications interface 960 may include logic and/or features to support a communication interface. For these examples, communications interface 960 may include one or more communication interfaces that operate according to various communication protocols or standards to communicate over communication links or channels. Communications may occur via use of communication protocols or standards described in one or more industry standards (including progenies and variants) such as those associated with the PCI Express, SATA or SCSI standard or specifications.

The components and features of PFFDC system 900 may be implemented using any combination of discrete circuitry, application specific integrated circuits (ASICs), logic gates and/or single chip architectures. Further, the features of PFFDC system 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example PFFDC system 900 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The following examples of the present disclosure are provided.

Example 1

An exemplary apparatus may include a docking system containing a first memory storage and a mobile device having an interface to communicatively couple with the docking system, the mobile device containing a second memory storage, and logic, at least a portion of which is in hardware, the logic to cause a processor of the mobile device to access the first memory storage of the docking system during execution of a memory computation based on a determination that the mobile device is communicatively coupled with the docking system.

Example 2

The apparatus of example 1, further including the logic to determine whether the mobile device is physically coupled with the docking system, and select between multiple platform form factors based on a determination that the mobile device is physically coupled with the docking system.

Example 3

The apparatus of example 1, further including the logic to select a small form factor display mode for execution of the memory computation in response to the mobile device not being physically coupled with the docking system.

Example 4

The apparatus of example 3, further including the logic to perform a graphics computation in the small form factor display mode using only the second memory storage of the mobile device.

Example 5

The apparatus of example 3, further including the logic to select a large form factor display mode for execution of the memory computation in response to the mobile device being physically coupled with the docking system.

Example 6

The apparatus of example 5, further including the logic to perform a graphics computation in the large form factor display mode using the first memory storage and the second memory storage.

Example 7

The apparatus of example 5, further including the logic to change a display mode from the small form factor display mode to the large form factor display mode when the mobile device is physically coupled with the docking system, and to change the display mode from the large form factor display mode to the small form factor display mode when the mobile device is not physically coupled with the docking system.

Example 8

The apparatus of example 1, further including a connector providing physical and electrical coupling between the mobile device and the docking system, wherein the connector includes a first connector element coupled with a printed circuit board of the mobile device, and a second connector element extending from the docking system to matingly receive the first connector element.

Example 9

The apparatus of example 8, the connector being a card edge-type connector.

Example 10

An exemplary computer-implemented method may include generating one or more signals to cause a processor of a small form factor (SFF) mobile device to access a first memory storage of a docking system and a second memory storage of the mobile device, and executing a memory computation using at least one of the first memory storage and the second memory storage based on a determination that the SFF mobile device is coupled with the docking system.

Example 11

The computer-implemented method of example 10, further including determining whether the SFF mobile device is physically coupled with the docking system, and selecting between multiple platform form factors based on a determination that the SFF mobile device is physically coupled with the docking system.

Example 12

The computer-implemented method of example 10, further including selecting a small form factor display mode for execution of the memory computation in response to the SFF mobile device not being physically coupled with the docking system.

Example 13

The computer-implemented method of example 12, further including performing the memory computation in the small form factor display mode using only the second memory storage of the SFF mobile device.

Example 14

The computer-implemented method of example 10, further including selecting a large form factor display mode in response to the SFF mobile device being physically coupled with the docking system.

Example 15

The computer-implemented method of example 14, further including performing the memory computation in the large form factor display mode using the first memory storage and the second memory storage.

Example 16

At least one machine readable medium including a plurality of instructions that in response to being executed by a system cause the system to carry out a method according to any one of claims 10 to 15.

Example 17

An apparatus including means for performing the methods of any one of claims 10 to 15.

Example 18

An exemplary system may include a split memory array including a first memory element contained within a docking system and a second memory element contained within a mobile device, an interface logic component of the mobile device, and a platform form factor (PFF) determination component to dynamically select between multiple platform form factors based on a determination that the mobile device is coupled with the docking system, the interface logic component to access the first memory storage element of the docking system during a graphics computation based on a determination that the mobile device is coupled with the docking system.

Example 19

The system of example 18, the PFF determination component to select a small form factor display mode in the case the mobile device is physically and electrically coupled with the docking system.

Example 20

The system of example 19, the PFF determination component to perform the graphics computation in the small form factor display mode using only the second memory element of the mobile device.

Example 21

The system of example 19, the PFF determination component to select a large form factor display mode in response to the mobile device being physically and electrically coupled with the docking system.

Example 22

The system of example 21, the PFF determination component to perform the graphics computation in the large form factor display mode using the first memory element and the second memory element.

Example 23

The system of example 21, the PFF determination component to change a display mode from the small form factor display mode to the large form factor display mode when the mobile device is physically and electrically coupled with the docking system, and to change a display mode of the mobile device from the large form factor display mode to the small form factor display mode when the mobile device is not physically and electrically coupled with the docking system.

Example 24

An exemplary apparatus may include a first memory storage, an interface to couple to a small form factor (SFF) mobile device, the SFF mobile device to comprise a processor and a second memory storage, and logic, at least a portion of which is in hardware, the logic to cause the processor to access the first memory storage as part of execution of a memory computation in response to the mobile device being coupled to the interface.

Example 25

The apparatus of example 24, further including the logic to determine whether the SFF mobile device is physically and electrically coupled with the docking system, and select between multiple platform form factors in response to a determination that the mobile device is physically and electrically coupled with the docking system.

Example 26

The apparatus of example 24, further including the logic to select a small form factor display mode for execution of the memory computation in response to the SFF mobile device not being physically and electrically coupled with the docking system, and to select a large form factor display mode for execution of the memory computation in response to the SFF mobile device being physically and electrically coupled with the docking system.

Example 27

The apparatus of example 26, further including the logic to perform a graphics computation in the large form factor display mode using the first memory storage and the second memory storage.

Example 28

The apparatus of example 26, further including the logic to perform a graphics computation in the small form factor display mode using only the second memory storage of the SFF mobile device.

Example 29

The apparatus of example 24, further including a connector providing physical and electrical coupling between the mobile device and the docking system, wherein the connector is a card edge-type connector.

Example 30

At least one non-transitory computer-readable storage medium for dynamically modifying platform form factors of a small form factor (SFF) mobile device, the at least one non-transitory computer-readable storage medium including a set of instructions that, in response to being executed on a processing component at a computing platform, cause the processing component to access a first memory storage of a docking system during execution of a memory computation based on a determination that a SFF mobile device is coupled with the docking system.

Example 31

The at least one non-transitory computer-readable storage medium of example 30, further including a set of instructions that, in response to being executed on the processing component at the computing platform, cause the processing component to determine whether the SFF mobile device is physically coupled with the docking system, and select between multiple platform form factors based on a determination that the SFF mobile device is physically coupled with the docking system.

Example 32

The at least one non-transitory computer-readable storage medium of example 30, further including a set of instructions that, in response to being executed on the processing component at the computing platform, cause the processing component to select a small form factor display mode for execution of the memory computation in response to the SFF mobile device not being physically coupled with the docking system.

Example 33

The at least one non-transitory computer-readable storage medium of example 32, further including a set of instructions that, in response to being executed on the processing component at the computing platform, cause the processing component to perform a graphics computation in the small form factor display mode using only the second memory storage of the SFF mobile device.

Example 34

The at least one non-transitory computer-readable storage medium of example 32, further including a set of instructions that, in response to being executed on the processing component at the computing platform, cause the processing component to select a large form factor display mode for execution of the memory computation in response to the SFF mobile device being physically coupled with the docking system.

Example 35

The at least one non-transitory computer-readable storage medium of example 34, further including a set of instructions that, in response to being executed on the processing component at the computing platform, cause the processing component to perform a graphics computation in the large form factor display mode using the first memory storage and the second memory storage.

Example 36

The at least one non-transitory computer-readable storage medium of example 34, further including a set of instructions that, in response to being executed on the processing component at the computing platform, cause the processing component to change a display mode from the small form factor display mode to the large form factor display mode when the SFF mobile device is physically coupled with the docking system, and to change the display mode from the large form factor display mode to the small form factor display mode when the SFF mobile device is not physically coupled with the docking system.

Example 37

An exemplary platform form factor modification method may include generating one or more signals to cause a processor of a small form factor (SFF) mobile device to access a first memory storage of a docking system and a second memory storage of the mobile device to execute a memory computation based on a determination that the SFF mobile device is coupled with the docking system.

Example 38

The platform form factor modification method of example 37, further including determining whether the SFF mobile device is physically coupled with the docking system, and selecting between multiple platform form factors based on a determination that the SFF mobile device is physically coupled with the docking system.

Example 39

The platform form factor modification method of example 37, further including selecting a small form factor display mode for execution of the memory computation in response to the SFF mobile device not being physically coupled with the docking system.

Example 40

The platform form factor modification method of example 39, further including performing the memory computation in the small form factor display mode using only the second memory storage of the SFF mobile device.

Example 41

The platform form factor modification method of example 37, further including selecting a large form factor display mode in response to the SFF mobile device being physically coupled with the docking system.

Example 42

The platform form factor modification method of example 41, further including performing the memory computation in the large form factor display mode using the first memory storage and the second memory storage.

Example 43

At least one machine readable medium including a plurality of instructions that in response to being executed by a system cause the system to carry out a method according to any one of examples 37-42.

Example 43

An apparatus including means for performing the methods of any one of examples 37-42.

Example 44

An exemplary platform form factor modification apparatus including a docking system containing a first memory storage and a small form factor (SFF) mobile device coupleable with the docking system, the SFF mobile device containing a second memory storage, and a platform form factor (PFF) determination component to cause a processor of the SFF mobile device to access the first memory storage of the docking system during execution of a memory computation based on a determination that the SFF mobile device is coupled with the docking system.

Example 45

The PFF modification apparatus of example 44, the PFF determination component further causing the processor to determine whether the SFF mobile device is physically coupled with the docking system, and select between multiple platform form factors based on a determination that the SFF mobile device is physically coupled with the docking system.

Example 46

The PFF modification apparatus of example 44, the PFF determination component further causing the processor to select a small form factor display mode for execution of the memory computation in response to the SFF mobile device not being physically coupled with the docking system.

Example 47

The PFF modification apparatus of example 46, the PFF determination component further causing the processor to perform a graphics computation in the small form factor display mode using only the second memory storage of the SFF mobile device.

Example 48

The PFF modification apparatus of example 46, the PFF determination component further causing the processor to select a large form factor display mode for execution of the memory computation in response to the SFF mobile device being physically coupled with the docking system.

Example 49

The PFF modification apparatus of example 48, the PFF determination component further causing the processor to perform a graphics computation in the large form factor display mode using the first memory storage and the second memory storage.

Example 50

The PFF modification apparatus of example 48, the PFF determination component further causing the processor to change a display mode from the small form factor display mode to the large form factor display mode when the SFF mobile device is physically coupled with the docking system, and to change the display mode from the large form factor display mode to the small form factor display mode when the SFF mobile device is not physically coupled with the docking system.

Example 51

The PFF modification apparatus of example 44, further including a connector providing physical and electrical coupling between the mobile device and the docking system, wherein the connector includes a first connector element coupled with a printed circuit board of the mobile device, and a second connector element extending from the docking system to matingly receive the first connector element.

Example 52

The PFF modification apparatus of example 51, the connector being a card edge-type connector.

Example 53

An exemplary platform form factor modification apparatus including a first memory storage, an interface to couple to a small form factor (SFF) mobile device, the SFF mobile device to include a processor and a second memory storage, and a platform form factor (PFF) modification component to cause a processor of the SFF mobile device to access the first memory storage as part of execution of a memory computation in response to the SFF mobile device being coupled to the interface.

Example 54

The PFF modification apparatus of example 53, the PFF modification component further causing the processor to determine whether the SFF mobile device is physically and electrically coupled with the docking system, and select between multiple platform form factors in response to a determination that the mobile device is physically and electrically coupled with the docking system.

Example 55

The PFF modification apparatus of example 53, the PFF modification component further causing the processor to select a small form factor display mode for execution of the memory computation in response to the SFF mobile device not being physically and electrically coupled with the docking system, and to select a large form factor display mode for execution of the memory computation in response to the SFF mobile device being physically and electrically coupled with the docking system.

Example 56

The PFF modification apparatus of example 55, the PFF modification component further causing the processor to perform a graphics computation in the large form factor display mode using the first memory storage and the second memory storage.

Example 57

The PFF modification apparatus of example 55, the PFF modification component further causing the processor to perform a graphics computation in the small form factor display mode using only the second memory storage of the SFF mobile device.

Example 58

The PFF modification apparatus of example 55, further including a connector providing physical and electrical coupling between the SFF mobile device and the docking system, wherein the connector is a card edge-type connector.

Example 59

At least one machine readable medium for platform form factor modification, the at least one machine readable medium including a plurality of instructions that in response to being executed by a processor on a computing platform, cause the processor to access the first memory storage as part of execution of a memory computation in response to the SFF mobile device being coupled to the interface.

Example 60

The at least one machine readable medium of example 59, further including a plurality of instructions that in response to being executed by a processor on a computing platform, cause the processor to determine whether the SFF mobile device is physically and electrically coupled with the docking system, and select between multiple platform form factors in response to a determination that the mobile device is physically and electrically coupled with the docking system.

Example 61

The at least one machine readable medium of example 60, further including a plurality of instructions that in response to being executed by a processor on a computing platform, cause the processor to select a small form factor display mode for execution of the memory computation in response to the SFF mobile device not being physically and electrically coupled with the docking system, and to select a large form factor display mode for execution of the memory computation in response to the SFF mobile device being physically and electrically coupled with the docking system.

Example 62

The at least one machine readable medium of example 60, further including a plurality of instructions that in response to being executed by a processor on a computing platform, cause the processor to perform a graphics computation in the large form factor display mode using the first memory storage and the second memory storage.

Example 63

The at least one machine readable medium of example 60, further including a plurality of instructions that in response to being executed by a processor on a computing platform, cause the processor to perform a graphics computation in the small form factor display mode using only the second memory storage of the SFF mobile device.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a docking system comprising:
first memory; and
a docking interface; and
a mobile device comprising:
a processor;
second memory;
an interface logic component to couple to the docking interface via a bus; and
a host interface, the host interface to:
determine whether the mobile device is physically coupled to the docking system,
determine whether the host interface is electrically coupled to the docking interface via the bus,
dynamically select a large form factor (LFF) display mode based on a determination that the mobile device is physically coupled with the docking system and a determination that the host interface is electrically coupled to the docking interface via the bus,
receive a docking indication from the docking interface,
send, responsive to the docking indication, a control signal to the docking interface, the control signal comprising an indication to
access both the first memory of the docking system and the second memory of the mobile device during a graphics computation during the LFF display mode.

2. The system of claim 1, the host interface to:
determine whether the mobile device has become physically and electrically disconnected from the docking system; and
change the display mode of the mobile device from the LFF display mode to a small form factor (SFF) display mode responsive to a determination that the mobile device has become physically and electrically disconnected from the docking system.

3. The system of claim 2, wherein the mobile device is a SFF mobile device.

4. The system of claim 2, the host interface to perform a second graphics computation, during the SFF display mode using only the first memory of the mobile device.

5. The system of claim 1, further comprising a connector providing physical and electrical coupling between the mobile device and the docking system, wherein the connector includes:
a first connector element coupled with a printed circuit board of the mobile device; and
a second connector element extending from the docking system to matingly receive the first connector element.

6. The system of claim 5, the connector being a card edge-type connector.

7. A computer-implemented method comprising:
determining, at a mobile device, whether the mobile device is physically coupled to a docking system, the docking system comprising first memory storage and a docking interface, the mobile device comprising second memory storage and a host interface;
determine whether the host interface of the mobile device is electrically coupled to the docking interface via a bus;
dynamically selecting a large form factor (LFF) display mode based on a determination that the mobile device is physically coupled with the docking system and a determination that the host interface is electrically coupled to the docking interface via the bus;

receiving, at the mobile device, a docking indication from the docking interface; and sending, responsive to the docking indication, a control signal to the docking interface, the control signal comprising an indication to access both the first memory storage of the docking system and the second memory storage of the mobile device during a graphics computation during the LFF display mode.

8. The computer-implemented method of claim 7, further comprising changing a display mode of the mobile device from the LFF display mode to a small form factor (SFF) display mode when the mobile device is no longer physically and electrically coupled with the docking system.

9. The method of claim 8, comprising performing a second graphics computation, during the SFF display mode using only the first memory storage of the mobile device.

10. An apparatus comprising:
a processor of a mobile device;
an interface to couple to a docking interface of a docking system, the docking system comprising docking memory storage and the docking interface; and
first memory storage, the first memory storage comprising instructions executable by the processor, which when executed cause the processor to:
determine whether the mobile device is physically coupled to the docking system,
determine whether the interface is electrically coupled to the docking interface via a bus,
dynamically select a large form factor (LFF) display mode based on a determination that the mobile device is physically coupled with the docking system and a determination that the interface is electrically coupled to the docking interface via the bus,
receive a docking indication from the docking interface,
send, responsive to the docking indication, a control signal to the docking interface, the control signal comprising an indication to access both the first memory storage of the mobile device and the docking memory storage of the docking system during a graphics computation during the LFF display mode.

11. The apparatus of claim 10, the instructions when executed by the processor cause the processor to change a display mode of the mobile device from the LFF display mode to a small form factor (SFF) display mode in response to the mobile device no longer being physically and electrically coupled with the docking system.

12. The apparatus of claim 11, the instructions when executed by the processor cause the processor to perform a second graphics computation, during the SFF display mode using only the first memory storage of the mobile device.

13. The apparatus of claim 10, further comprising a connector providing physical and electrical coupling between the mobile device and the docking system.

14. The apparatus of claim 13, wherein the connector is a card edge-type connector.

15. The apparatus of claim 10, comprising a display, a battery, and a radio.

16. The apparatus of claim 15, comprising at least one sensor.

* * * * *